(12) United States Patent
Srivastava et al.

(10) Patent No.: US 12,393,470 B2
(45) Date of Patent: Aug. 19, 2025

(54) APPLICATION PROGRAMMING INTERFACE (API) ENABLER FOR UPDATED APIs

(71) Applicant: SAP SE, Walldorf (DE)

(72) Inventors: Garima Srivastava, Bangalore (IN); Jenifer Sam, Bangalore (IN)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 17/903,508

(22) Filed: Sep. 6, 2022

(65) Prior Publication Data

US 2024/0078140 A1 Mar. 7, 2024

(51) Int. Cl.
*G06F 9/54* (2006.01)
*G06F 8/65* (2018.01)

(52) U.S. Cl.
CPC .............. *G06F 9/541* (2013.01); *G06F 8/65* (2013.01)

(58) Field of Classification Search
CPC ... G06F 9/541; G06F 8/65; G06F 8/36; G06F 9/44526; G06F 8/70; G06F 8/71
See application file for complete search history.

(56) References Cited

U.S. PATENT DOCUMENTS

| | | | |
|---|---|---|---|
| 9,063,748 B1 * | 6/2015 | Bakale | G06F 8/71 |
| 9,965,379 B1 * | 5/2018 | Hariharan | G06F 11/3672 |
| 10,452,522 B1 * | 10/2019 | Arguelles | G06F 11/3684 |
| 10,769,000 B1 * | 9/2020 | Plunk | G06F 9/44536 |
| 10,810,065 B1 * | 10/2020 | Banerjee | G06F 9/546 |
| 2006/0136423 A1 * | 6/2006 | Lee | G06F 8/65 |
| 2012/0110547 A1 * | 5/2012 | Wendel | G06F 9/4488 717/100 |
| 2013/0132584 A1 * | 5/2013 | Palladino | G06F 9/541 709/226 |

(Continued)

OTHER PUBLICATIONS

Hardy, P.D. (Mar. 17, 2021). Ensuring Code Runs in ABAP in the Cloud. In: Improving the Quality of ABAP Code. Apress, Berkeley, CA. pp. 451-476. (Year: 2021).*

(Continued)

*Primary Examiner* — Kevin L Young
*Assistant Examiner* — Jennifer Marie Gutman
(74) *Attorney, Agent, or Firm* — Buckley, Maschoff & Talwalkar LLC (57) ABSTRACT

According to some embodiments, systems and methods are provided, including a repository storing at least an Application Programming Interface (API) mapping table; a memory storing processor-executable program code; and a processing unit to execute the processor-executable program code to: receive an input of one or more legacy API identification elements for a legacy API; determine whether the received legacy API identification elements correspond to a standard legacy API; in a case the received legacy API identification elements do correspond to a standard legacy API, determine whether a corresponding updated API is available; in a case the corresponding updated API is available, determine whether the legacy API includes at least one extension; and in a case the legacy API does include at least one extension, generate an updated corresponding API extension, and transmit the corresponding updated API and the updated corresponding API extension to the user. Numerous other aspects are provided.

20 Claims, 9 Drawing Sheets

(56) References Cited

U.S. PATENT DOCUMENTS

| | | | |
|---|---|---|---|
| 2016/0164722 A1* | 6/2016 | Zhu | H04L 41/082 |
| | | | 709/221 |
| 2016/0165010 A1* | 6/2016 | Bacovsky | H04L 67/10 |
| | | | 709/203 |
| 2017/0060878 A1* | 3/2017 | Demant | G06F 16/211 |
| 2017/0337052 A1* | 11/2017 | Elkabany | G06F 8/71 |
| 2017/0371937 A1* | 12/2017 | Shah | G06F 8/71 |
| 2018/0107479 A1* | 4/2018 | Duppenthaler | G06F 8/71 |
| 2023/0030187 A1* | 2/2023 | Shankar | G06F 9/5072 |
| 2023/0092030 A1* | 3/2023 | Battaglia | G06F 8/10 |
| | | | 717/104 |

OTHER PUBLICATIONS

Salesforce Stack Exchange, "Remove the '_c' from custom field API name". Posted and last modified Oct. 17, 2019. (Year: 2019).*
Hardy, P.D. (Mar. 17, 2021). Ensuring Code Runs ABAP in the Cloud. In: Improving the Quality of ABAP Code. Apress, Berkeley, CA. pp. 451-476. (Year: 2021).*

* cited by examiner

| OBJECT TYPE | UPDATED API NAME | API AVAILABLE FROM RELEASE VERSION | OP AND CLOUD RELEVANT | LEGACY API NAME | LEGACY API TYPE |
|---|---|---|---|---|---|
| Purchase Order | MM_PUR_PROCESS_SRV | CE2005 | YES | MM_PUR_IDOC | IDOC |

| PURCHASING DOCUMENT NO. |
| ITEM NO. OF PURCHASING DOC |
| MATERIAL NO. |
| COMPANY CODE |
| PURCHASE ORDER QUANTITY |
| PURCHASE ORDER UNIT OF MEASURE |
| CREATED BY |
| CREATED ON |

APPLICATION PROGRAMMING INTERFACE (API) ENABLER FOR UPDATED APIs

BACKGROUND

Application Programming Interfaces (APIs) are a type of software interface that allows two or more computer programs to communicate with each other without any user intervention. In particular, the API is a collection of software functions/procedures (code) that allow unrelated software products to integrate and interoperate with other software and data, allowing data to be shared across system boundaries. Organizations may build/employ APIs to allow users to interact with and consume data from different applications. There are several types of APIs that are commonly used in web-based applications, including public and private. The type may indicate the intended scope of the use. A public API is open and available for use by any outside developer or organization. Public APIs typically involve moderate authentication and authorization. A private (or internal) API is intended only for use within the organization to connect systems and data within the organization. For example, an internal API may connect an organization's payroll and HR systems.

An API may be created via the non-exhaustive examples of a Remote Function Call (RFC), Business API (BAPI) or an Intermediate Document (IDOC) or other similar Remote Procedure Call mechanisms. With RFC, there is an RFC client and an RFC server, whereby the client calls a function on the server and the function is executed on the remote system. BAPI makes business objects available in one system accessible by external systems. The Business Objects (BO) represent real objects such as orders, customers or articles. The instances of business objects are accessed exclusively using methods provided by the BO. The instance to which the calls are made is determined by key fields (e.g., customer number, etc.). IDOC is a particular file format that is intended for transfer of transaction data. The structure of an IDOC is prescribed by the IDOC type and defines the exact length and position of fields in the file. The sender creates an IDOC with data according to the specification of the IDOC type and transfers it to a target system. The receiving system accepts the IDOC and inserts it into the processing buffer for IDOCS, from which the documents are processed successively. APIs created via RFC, BAPI, and IDOC may be referred to as "Legacy APIs."

As organizations evolve, they are using more applications that run on a cloud. However, it may be challenging for organizations to transition these Legacy APIs for use in a cloud environment and the transition may involve a large manual effort.

Systems and methods are desired that provide for the use of legacy APIs in the cloud environment.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein. It should be appreciated that in development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

As described above, Application Programming Interfaces (API)s are a type of software interface that allows two or more computer programs to communicate based on a set of rules that define how the applications or devices can connect and communicate with each other. The API enables an application or service to access a resource within another application or service, where the application/service doing the accessing is the client and the application/service containing the resource is the server. APIs may be created via an RFC, a BAPI and an IDOCs, and an API created via an RFC, a BAPI and an IDOCs may be referred to as a "Legacy API". In addition to an API having a type of public or private, the API may be categorized as one of a standard API and a custom API.

The standard API may be created and delivered to a user for the integration and sending of data from one software system to another. The standard API may be a vanilla or non-customized version of an API. In some instances, a user may have created and may use custom specific extensions on top of a standard API (e.g., custom fields in IDOCs). For example, consider a Purchase Order use case. The standard API for the purchase order may include ten fields. However, a particular user may have two extra fields as part of their Purchase Order that is very specific for their business. To that end, the user may create an extension to the standard API that includes the two business objects that represent the two extra fields. The extension is one or more elements that modify a response of the standard legacy API.

A custom API for custom business objects may be created by a user or a partner. This is not an extension of a standard API, but instead is a new custom API specifically for the custom business object. To generate the custom API, the user may create BAPIs, IDOCS, etc. and then create an API based thereon to provide for integration between their systems. With respect to the custom API created by the partner, partners who have their own Advanced Business Application Programming (ABAP)-ADD-ONs (running either on top of a standard SAP® offering or on a separate system) may also create APIs via BAPIs, RFCs, and IDOCs for seamless integration between their systems and other systems.

As also described above, organizations are transitioning aspects of running their businesses to a cloud environment. To this end, organizations are building applications to run on the cloud, as well as transforming existing applications to run on the cloud. As a non-exhaustive example, SAP® provides an ABAP runtime environment ("ABAP Steampunk") on their cloud platform (Business Technology Platform (BTP)), which is a Platform-as-a-Service (Paas) offering that provides a controlled environment in line with cloud development principles. Any development on ABAP on BTP may use an ABAP RESTful Application Programming Model (RAP). RAP is a development paradigm/framework that may support the efficient development of cloud-ready applications, new APIs (which may be referred to as a "RAP API"), as well as the extension of standard APIs and applications to the cloud environment. RAP may be used to build new standard applications and modernize existing ones. RAP may be based on: Core Data Services (CDS) used to define semantic rich data models for all application domains; modernized and extended ABAP language used to implement business logic; OData protocol used for stateless communication; the concept of Business Objects (BO) used for building transactional applications. RAP may be based on other suitable concepts.

While the new applications and APIs are helpful, users may want to update/modernize their existing legacy APIs to be used in the cloud platform. Conventionally, to update a legacy API, a user would need to manually re-create the legacy APIs and extensions.

By virtue of some embodiments, an API enabler module is provided to identify a corresponding updated API for a given legacy API. As a non-exhaustive example, a user has been using a legacy purchase order API, and now an updated purchase order API is available. Conventionally, there is no way for the user to automatically know there is an updated API, and the legacy API will eventually be deprecated and will one date cease functioning.

The API enabler module may also create a updated extension for an updated API that corresponds to a given extension for the corresponding legacy API. This may be applicable when a user has created an extension on top of a legacy API. Conventionally there is a lot of manual effort for a user to create their own extensions on top of the updated APIs, including having the user learning a new programming development paradigm in some instances. In embodiments, the API enabler module may first identify the updated API that maps to the legacy API, second identify the extension on the legacy API, and third provide a corresponding updated hook in the identified updated API for an updated extension.

In some embodiments, the API enabler module may also automatically create updated APIs for custom objects corresponding to a custom legacy API. This may be applicable when a user has developed their own custom legacy API via a custom IDOCs, custom BAPI, etc. The API enabler module may generate a custom updated API by identifying the tables involved, executing a Core Data Services generation, generating a service definition, providing a binding and then generating the custom updated API.

The API enabler module may provide for a reduction in overhead of having to invest in a knowledge upgrading to use the new programming development paradigm, and may provide for a reduction in the development effort used in the creation of custom updated APIs or extension.

In one or more embodiments, the API enabler module may be deployed as a Software-as-a-Service (SaaS) option on the cloud platform. With this deployment option, the API enabler module may complement other integration functionalities, and may be used by existing users. With this deployment option, a user using legacy APIs with created extensions may use the API enabler module to convert the extensions to updated APIs with updated extensions; a user using custom legacy APIs may use the API enabler module to convert these custom legacy APIs to custom updated APIs.

In other embodiments, the API enabler module may be deployed as a standard offering along with the use of an Enterprise Resource Planning (ERP) software/cloud package. With this deployment option, when a user transitions to the ERP software, the API enabler module enables the user to either convert the extensions to updated APIs with updated extensions or create updated APIs with minimal effort and time.

Figure 1:
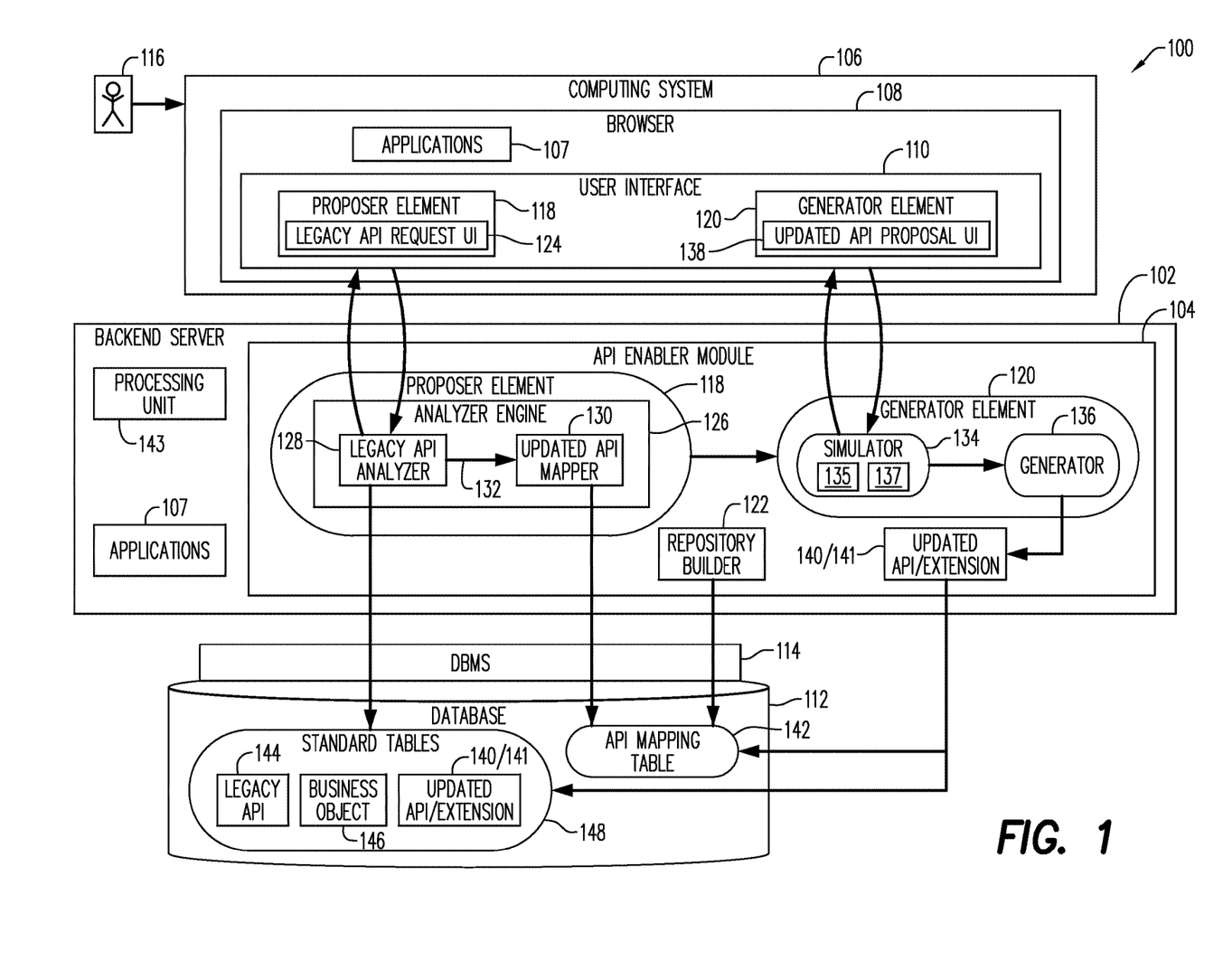
FIG. 1 illustrates a system according to some embodiments.

FIG. 1 is a block diagram of architecture 100 according to some embodiments. The illustrated elements of architecture 100 and of all other architectures depicted herein may be implemented using any suitable combination of computing hardware and/or software that is or becomes known. Such combinations may include one or more programmable processors (microprocessors, central processing units, microprocessor cores, execution threads), one or more non-transitory electronic storage media, and processor-executable program code. In some embodiments, two or more elements of architecture 100 are implemented by a single computing device, and/or two or more elements of architecture 100 are co-located. One or more elements of architecture 100 may be implemented using cloud-based resources, and/or other systems which apportion computing resources elastically according to demand, need, price, and/or any other metric.

Architecture 100 includes a backend server 102, an API enabler module 104, a local computing system 106 including a browser 108 and user interface 110, a database 112, a database management system (DBMS) 114, and a client/user 116.

The backend server 102 may include applications 107. Applications 107 may comprise server-side executable program code (e.g., compiled code, scripts, etc.) executing within the backend server 102 to receive queries/requests from clients 116, via the local computing system 106, and provide results to clients 116 based on the data of database 112, and the output of the API enabler module 104. A client 116 may access, via the local computing system 106, the API enabler module 104 executing within the server 102, to access an updated API, as described below.

The server 102 may provide any suitable interfaces through which users 116 may communicate with the API enabler module 104 or applications 107 executing thereon. The server 102 may include a Hyper Text Transfer Protocol (HTTP) interface supporting a transient request/response protocol over Transmission Control Protocol/Internet Protocol (TCP/IP), a Web Socket interface supporting non-transient full-duplex communications which implement the Web Socket protocol over a single TCP/IP connection, and/or an Open Data Protocol (OData) interface.

Local computing system 106 may comprise a computing system operated by local user 116. Local computing system 106 may comprise a laptop computer, a desktop computer, or a tablet computer, but embodiments are not limited thereto. Local computing system 106 may consist of any combination of computing hardware and software suitable to allow system 106 to execute program code to cause the system 106 to perform the functions described herein and to store such program code and associated data.

Generally, computing system 106 executes one or more of applications 107 to provide functionality to user 116. Applications 107 may comprise any software applications that are or become known, including but not limited to data analytics applications. As will be described below, applications 107 may comprise web applications which execute within a web browser 108 of system 106 and interact with corresponding remote cloud-based applications to provide desired functionality. User 116 may instruct system 106 as is known to execute one or more of applications 107 and may interact with resulting displayed user interfaces 110 of the executing applications 107 to obtain the desired functionality therefrom.

The API enabler module 104 may include a proposer element 118, a generator element 120 and a repository builder 122. The proposer element 118 may include program code to deliver a legacy API request User Interface (UI) 124 to the computing system 106. As described further below, a user 116 may request the system 100 to provide an updated API via the legacy API request UI 124. The proposer element 118 may also include an analyzer engine 126. For every legacy API input to the API enabler module 104, the analyzer engine 126 may execute program code to determine how the received legacy API may be updated.

The analyzer engine 126 may include a Legacy API analyzer 128 having program code to determine whether the input legacy API is a standard legacy API or a custom legacy API. A standard legacy API may be an API that was originally released prior to a request for an updated API. As used herein, "release" is the distribution of a final or newest version of the API. So, the standard legacy API may be the newest version that has been distributed. In some embodiments, the analyzer engine 126 may execute a classifier algorithm to determine whether the input legacy API is a standard legacy API or a custom legacy API, as described further below.

The analyzer engine 126 may also include an updated API mapper 130 having program code to provide proposals for the availability of an updated API. The proposals may be to provide an updated API that has been previously generated or to generate an updated API. In some embodiments, the updated API mapper 130 may receive the classification output 132 from the Legacy API analyzer 128. The updated API mapper 130 may determine, based on the delivery type of API (standard or custom), an updated API to propose, as described further below.

The generator element 120 may be an engine including a simulator 134 and a generator 136. The simulator 134 may include program code that provides for the updated API or updated API extension to be simulated onto a target system and then the generator 136 may include program code to generate the updated API/extensions in response to user confirmation of the simulation. In some embodiments, the simulator 134 may generate the updated API/extension to help the user 116 understand the kind of API transformation that may be executed in the target version. The simulation may be displayed to the user on an updated API proposal UI 138 on the computing system 106. The updated API proposal UI 138 may display the structure of the interface view and added behavior definitions. The updated API proposal UI 138 may also request the user select a service binding of OData V2, OData V4, or any other suitable binding. Based on the service binding selected by the user 116 and user confirmation of the simulation, the generator 136 generates an updated API/extension 140/141.

The repository builder 122 may run as a scheduled background job that keeps an API mapping table 142 up to date. The API mapping table 142 may be a predefined template that contains the mapping of legacy APIs 144 to their corresponding updated APIs 140. The legacy API 144 may be identified by the business object it is created for, along with an API type (e.g., IDOC, BAPI, RFC). The API mapping table 142 may include a release availability for the updated APIs 140. With every new release or every new version, the API mapping table 142 may be populated with the updated APIs that are being released for that particular version/release and are mapped to the legacy API that was previously provided. For example, every time the repository builder 122 receives an updated API, the repository builder 122 may identify—by business object name—the business object used with the updated API and then may determine whether there is a legacy API associated with that same business object. In a case there is a legacy API associated with the same business object, the repository builder 122 adds the entry to the API mapping table 142.

One or more applications 107 executing on backend server 102 or local computing system 106 may communicate with DBMS 114 using database management interfaces such as, but not limited to, Open Database Connectivity (ODBC) and Java Database Connectivity (JDBC) interfaces. These types of applications 107 may use Structured Query Language (SQL) to manage and query data stored in database 112.

DBMS 114 serves requests to store, retrieve and/or modify data of database 112, and also performs administrative and management functions. Such functions may include snapshot and backup management, indexing, optimization, garbage collection, and/or any other database functions that are or become known. DBMS 114 may also provide application logic, such as database procedures and/or calculations, according to some embodiments. This application logic may comprise scripts, functional libraries and/or compiled program code. DBMS 114 may comprise any query-responsive database system that is or becomes known, including but not limited to a structured-query language (i.e., SQL) relational database management system.

Backend server 102 may provide application services (e.g., via functional libraries) which applications 107 may use to manage and query the data of database 112. The application services can be used to expose the database data model, with its tables, hierarchies, views and database procedures, to clients. In addition to exposing the data model, backend server 102 may host system services such as a search service.

Database 112 may store data used by at least one of: applications 107 and the API enabler module 104. For example, database 112 may store the API mapping table 142 which may be accessed by the API enabler module 104 during execution thereof.

Database 112 may comprise any query-responsive data source or sources that are or become known, including but not limited to a structured-query language (SQL) relational database management system. Database 112 may comprise a relational database, a multi-dimensional database, an extensible Markup Language (XML) document, or any other data storage system storing structured and/or unstructured data. The data of database 112 may be distributed among several relational databases, dimensional databases, and/or other data sources. Embodiments are not limited to any number or types of data sources.

Presentation of a user interface as described herein may comprise any degree or type of rendering, depending on the type of user interface code generated by the backend server 102/local computing system 106.

Figure 5:
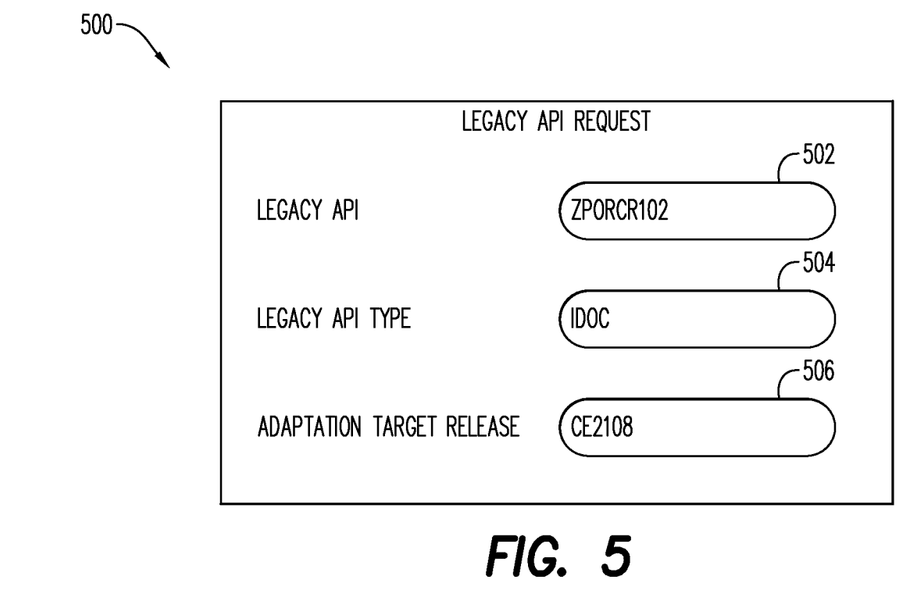
FIG. 5 illustrates a non-exhaustive example of a user interface according to some embodiments.
Figure 8:
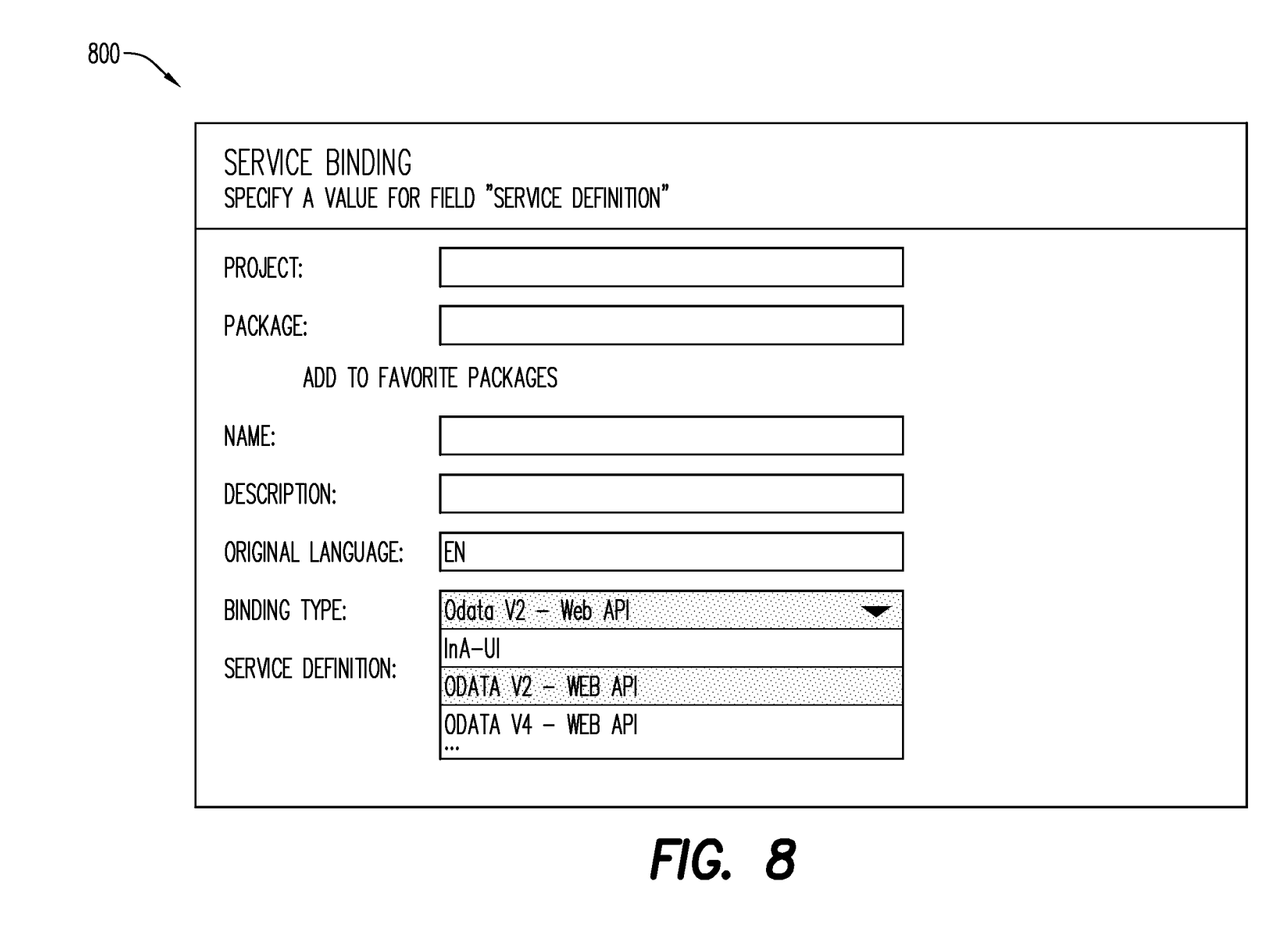
FIG. 8 illustrates a non-exhaustive example of a user interface according to some embodiments.

For example, a client 116 may execute a Web Browser to request and receive a Web page (e.g., in HTML format) from a website application 107 of backend server 102 to provide the UI 500/800 via HTTP, HTTPS, and/or Web Socket, and may render and present the Web page according to known protocols.

Figure 2:
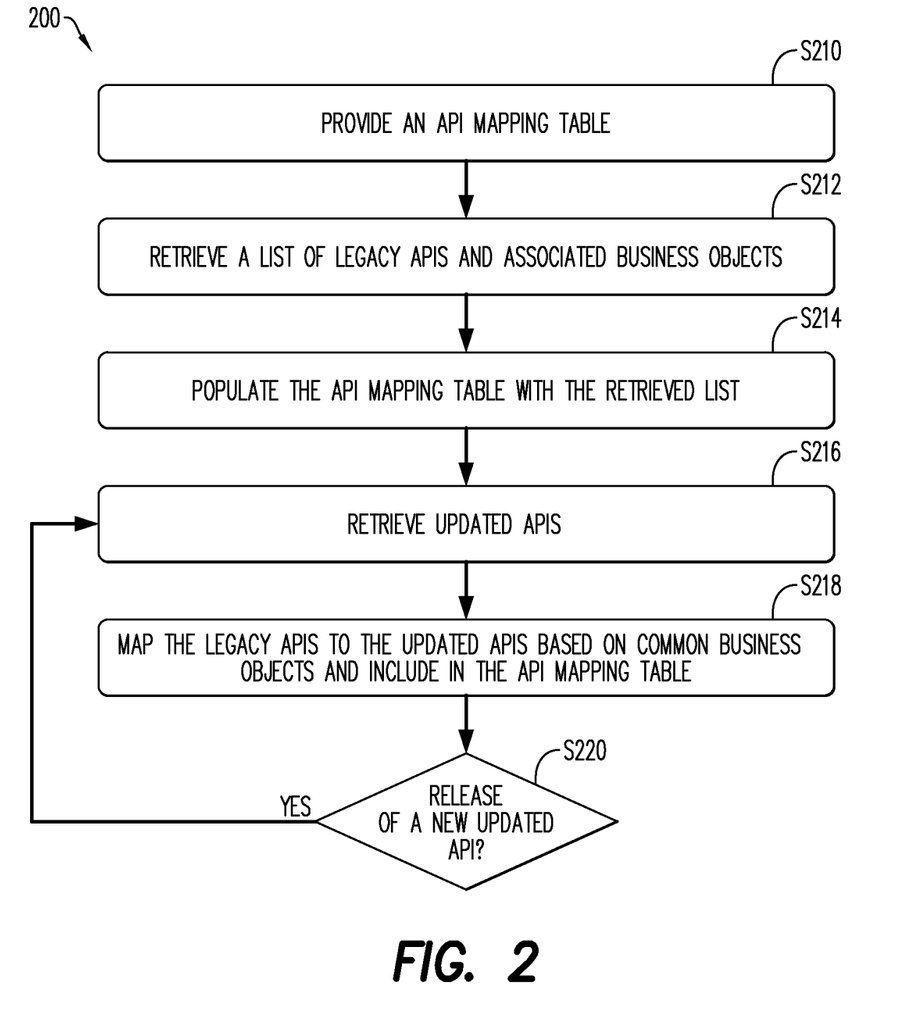
FIG. 2 is a flow diagram of a process according to some embodiments.
Figure 4:
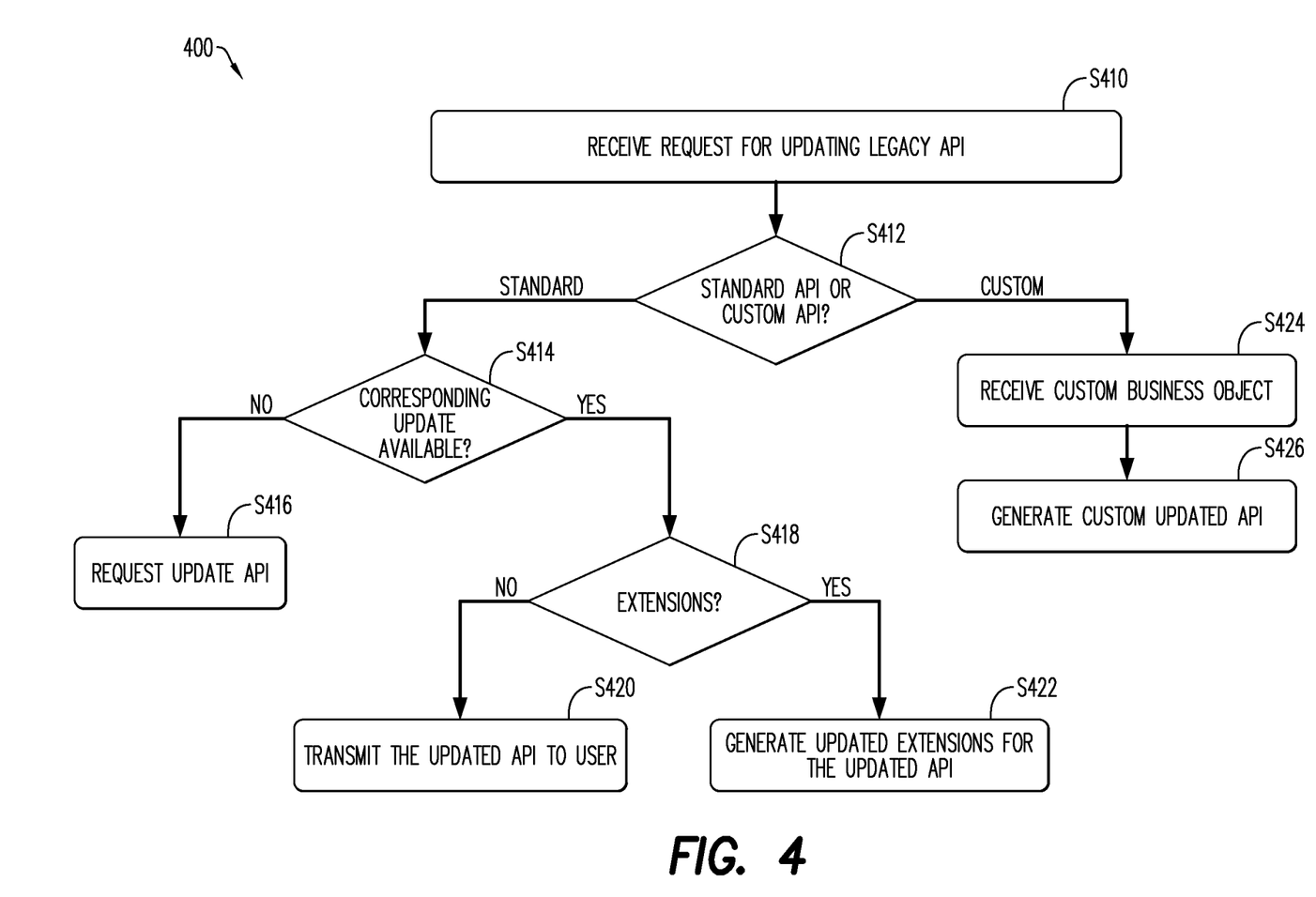
FIG. 4 is a flow diagram of a process according to some embodiments.

FIGS. 2 and 4 illustrate a method 200 of building an API mapping table; and a method 400 of updating an API, respectively, in accordance with an example embodiment. For example, the methods 200/400 may be performed by a database node, a cloud platform, a server, a computing system (user device), a combination of devices/nodes, or the like, according to some embodiments. In one or more embodiments, the computing system 106 or backend server 102 may be conditioned to perform the process 200/400, such that a processing unit 143 (FIG. 1) of the system 100 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

The API mapping table 142 is a predefined template that maps a legacy API to a corresponding updated API. A mapper program may be scheduled as a background job to keep the API mapping table 142 up to date. Initially, at S210, an API mapping table 142 is provided. Then in S212, a list of legacy APIs 144 and associated Business Object 146 are retrieved from standard tables 148 stored in the database 114. As a non-exhaustive example, a mapper program may be called internally to retrieve the list of standard delivered IDOCs and their associated business objects. Next, in S214, the API mapping table 142 is populated with the retrieved list of legacy APIs 144 and associated Business Objects 146. After the API mapping table 142 is populated with the legacy APIs 144 and Business Objects 146, the mapper program retrieves updated APIs 140 with business objects common to those in the API mapping table for the legacy APIs in S216 and maps the legacy APIs 144 to the updated APIs 140 in S218 based on common business objects. In some embodiments, an internally run report may be used to populate the API mapping table 142 with the updated APIs.

After the API mapping table 142 is initially populated, it is kept up to date. In S220, it is determined whether a new updated API has been published. In a case the new updated API has been published, the process may return to S216, and the API mapping table may be updated with the newly created updated API mapped to an existing legacy API. In some embodiments, the mapper program may be scheduled to check the standard tables for newly updated APIs, may receive notification that a newly updated API is available, or may determine a newly updated API is available via any other suitable process.

Figure 3:
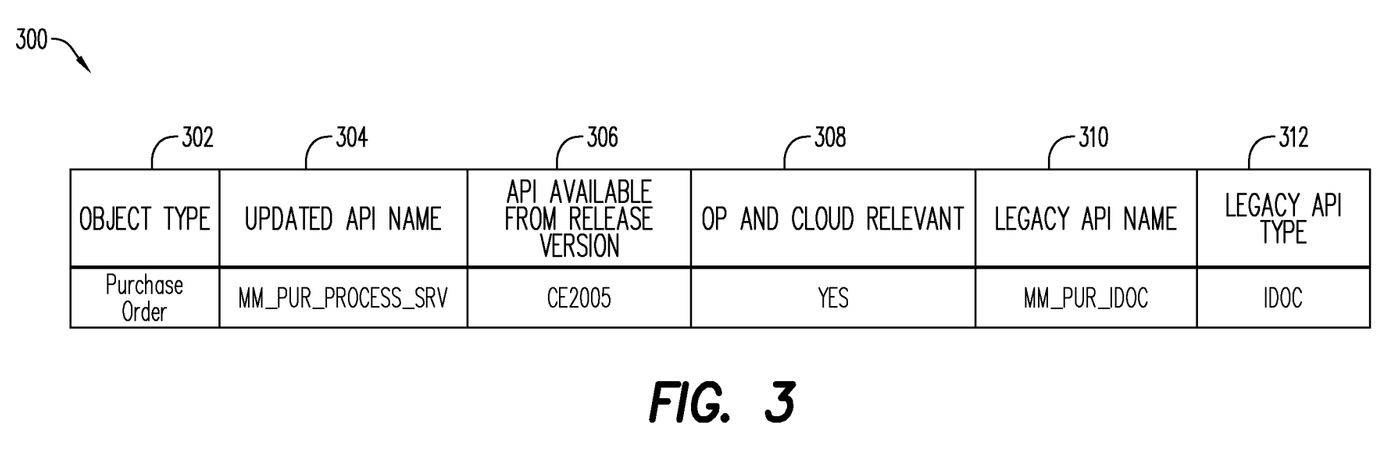
FIG. 3 illustrates a non-exhaustive example of an output according to some embodiments.

FIG. 3 provides a non-exhaustive example of the API mapping table 300. As described above, the API mapping table 300 may be used by an updated API mapper 130 to identify the updated API that needs to be adapted to the user-requested legacy API. The API mapping table 300 may be a database table that is stored at the database 112 according to some embodiments. The API mapping table 300 may include, for example, entries mapping the legacy APIs to the updated APIs. As described above, the mapping between the legacy APIs and the updated APIs is done based on business objects. The API mapping table 300 may also define fields 302, 304, 306, 308, 310, 312 for each of the entries. The fields 302, 304, 306, 308, 310, 312 may, according to some embodiments, specify: an object type 302, an updated API name 304, an API Available from Release Version (available from) 306, an On-Premise (OP) and Cloud relevant 308, legacy API name 310 and legacy API type 312 for each entry. The API mapping table 300 may be created and updated, for example, as described above.

The object type 302 may be, for example, a description of both the functionality and data/attributes for this entity. Purchase order may be a non-exhaustive example of an object type. The updated API name 304 may indicate the name of the updated API. The API Available from Release version 306 may indicate the release from which the API is available. The OP and Cloud relevant 308 indicator may be "yes" or "no" to indicate whether the updated API is usable with the cloud. The legacy API name 310 may indicate the name of the legacy API linked to the business object. The legacy API type 312 may indicate how the legacy API was created (e.g., IDOC, BAPI, RFC).

Turning to FIG. 4, a method 400 of updating an API is provided. Initially, at S410 a request for updating a legacy API 144 is received. In some embodiments, a user 116 may be notified that an updated API is available for their legacy API, or the user 116 may decide that they want to have their legacy API updated. The user 116 may then access a Legacy API Request UI 500 (FIG. 5) and input one or more Legacy API identification elements into a plurality of data entry fields to obtain the updated API. The Legacy API Request UI 500 may include a Legacy API data entry field 502 for receipt of the name of the legacy API the user wants an update for, a Legacy API Type (IDOC, BADI, RFC) data entry field 504 and an Adaptation Target Release data entry field 506 for receipt of the version of the updated API/extension the user wants.

Figure 6:
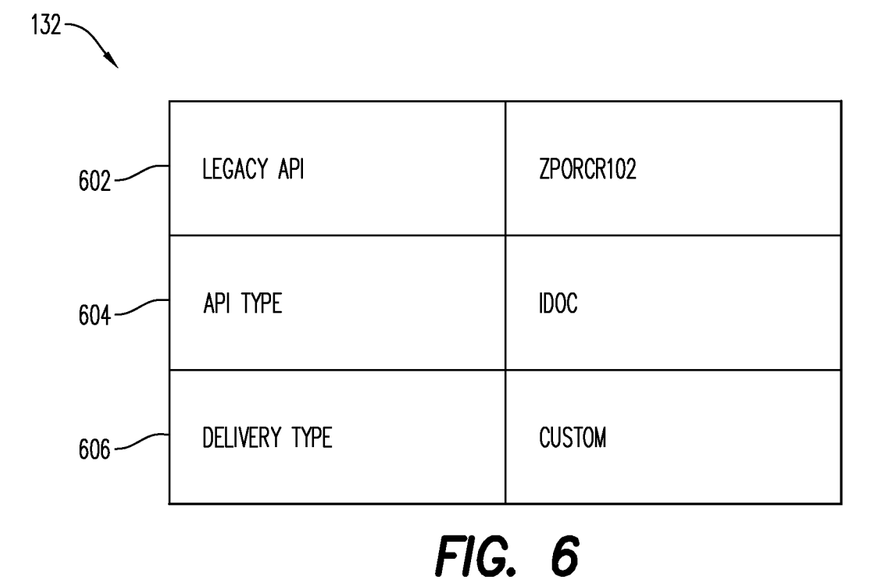
FIG. 6 illustrates a non-exhaustive example of an output according to some embodiments.

Then in S412, it is determined whether the input legacy API identifiers correspond to a standard API or a custom API. In embodiments, the Legacy API analyzer 128 receives the input data of Legacy API and Legacy Type. The Legacy API analyzer 128 may include program code to determine whether the API corresponding to that input data is a standard API or a custom API based on at least one of a namespace used in the legacy API name and an input API type. In a case a pre-defined identifier is present for the business object (e.g., the business object name has a prefix of a "Z" or a "Y"), that identifier is also included in the API name, and identifies the legacy API as a custom legacy API. In a case the pre-defined identifier/prefix is absent, the API is not customized and may be standard. In a case the legacy API has a type of IDOC, BAPI or RFC, the legacy API may be identified by the Legacy API analyzer 128 as a standard API. In some embodiments, the Legacy API Analyzer 128 may confirm the input Legacy API is a standard API by calling an internal report that confirms the entered API name is a standard API. The Legacy API Analyzer 128 may generate a classification output 132 (FIG. 6) based on the type of API (IDOC, BAPI, RFC) and/or delivery type (standard or custom). As shown in the non-exhaustive example in FIG. 6, the output 132 includes a Legacy API Name 602 of "ZPORCR102", an API Type 604 of "IDOC", and a Delivery Type 606 of "Custom."

In a case the Legacy API Analyzer 128 determines at S412 the legacy API is a standard legacy API, the process 400 proceeds to S414 and it is determined whether a corresponding updated API is available. In embodiments, the classification output 132 is received by the Updated API Mapper 130. The Updated API Mapper 130 may access the API mapping table 142 to identify if the standard legacy API is included therein, based on factors including, but not limited to, business object, relevance to cloud and release relevance. In a case it is determined there are no corresponding updated APIs available, the process 400 proceeds to S416 and an updated API is requested. It is noted that in some instances the user 116 may decide to inquire about an updated API without receiving external prompts, and in that case there may be no corresponding updated API available. There may be other situations where the user does receive an external prompt to obtain an updated API and there are no corresponding updated APIs available.

In a case it is determined in S414 there is a corresponding updated API available, the process 400 proceeds to S418 and it is determined whether the standard legacy API includes any extensions. In one or more embodiments, the Analyzer engine 126 may determine there are extensions by comparing a structure (e.g., fields) of the input standard legacy API to a structure of the updated API for the same Business Object as stored in the standard tables 148. The Analyzer engine 126 may determine the legacy API includes at least one extension by identifying at least one extension field that is present in the legacy API and absent from the corresponding updated API. Referring back to the example described above, the legacy API for Purchase Order may have ten fields, and there is an updated API for the Purchase Order Business Object also with ten fields, so there are no extensions present. Fields present in the input legacy standard API that are not present in the updated API stored in the standard table may be an extension. In a case it is determined that there are no extensions, the corresponding updated API determined in S414 is transmitted to the user 116 in S420.

In a case it is determined in S418 there are extensions, the generator element 120 may generate the extension in S422.

Figure 7:
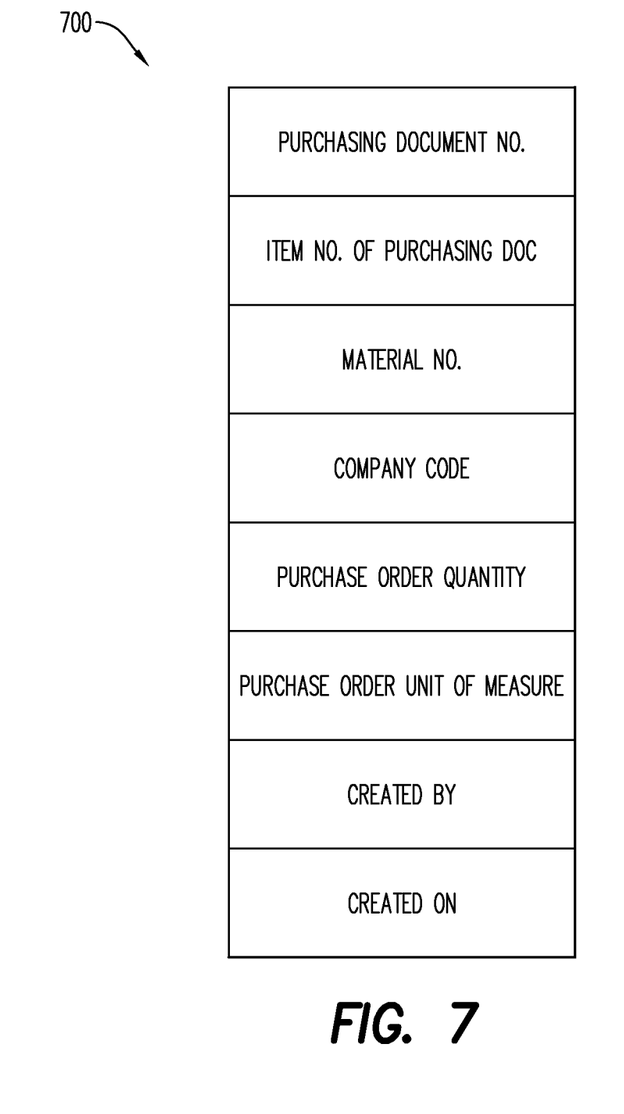
FIG. 7 illustrates a non-exhaustive example of an API structure according to some embodiments.

In embodiments, the simulator 134 may generate a simulated updated API 135 or extension 137. The simulator 134 may identify a segment structure for the legacy API that defines the structure (i.e., fields) 700 (FIG. 7) of the API. The defined structure 700 may be output in a table as shown in FIG. 7. As shown in FIG. 7, the structure in this non-exhaustive example includes the following fields: Purchasing Document Number, Item Number of Purchasing Document, Material number, Company Code, Purchase Order Quantity, Purchase Order Unit of Measure, Created By and Created On. In some embodiments, the generator element 120 may execute a report that executes a given transaction in the background to retrieve the structure 700 for a given legacy API. The simulator 134 may receive the structure 700 and create an intermediate virtual data model (which may be referred to as Core Data Services (CDS) view) that defines entities for the business object that reads from the received output structure. The intermediate view may bundle the fields which are present in a certain structure to be consumed as an updated API. Then the simulator 134 may create a consumption view that exposes entities of the business object by reading from the intermediate view. The consumption view may provide the structure in a user-readable format for consumption via a user interface. Next, behavior definitions are defined. In particular, definitions for create, update and delete operations. In this way, the simulation 135/137 provides the fields as well as the kind of operations the API may perform (e.g., the API may create or delete the business object). Implementation of the behavior definition may be standard with the updates. The simulator 134 may then define the behavior projections and the service definition. Definition of the service definition may identify the Core Data Service (CDS) entities of a data model that are to be exposed in the simulation so that a specific business service, for example, Sales Order handling, can be enabled. The service definition describes the consumer-specific but protocol-agnostic perspective on a data model.

After the simulated updated API 135 or extension 137 is generated, the simulation may be transmitted to the Updated API Proposal UI 138. The Updated API Proposal UI 138 may display for the user 116 a structure of the interface view and the added behavior definitions for the simulation 135/137. In a case the structure of the interface view and the added behavior definitions are acceptable to the user, the Updated API Proposal UI 138 may provide a Service Binding User Interface 800 (FIG. 8) to the user, asking the user to select between one of a plurality of service bindings. A service binding may be a repository object used to bind a service definition to a client-server communication protocol such as OData. While the service binding options herein include OData V2 and OData V4, other suitable service binding options may be available. A service binding may rely directly on a service definition that is derived from an underlying CDS-based model. Based on an individual service definition, a plurality of service bindings may be created. The separation between the service definition and the service binding may enable a service to integrate a variety of service protocols without any kind of re-implementation.

Following the service binding option selected by the user 116, and the user confirmation for the simulation 135/137, the generator 136 generates the updated API/extension 140/141. In some embodiments, the generator 136 may fetch the simulation 135/137 and automate the generation of the service binding. The generator 136 may identify any underlying database tables for the updated API/extension 140/141, generate a CDS view with the appropriate business objects for the updated API/extension 140/141, generate a service definition and service binding for the updated API/extension 140/141 and finally generate a web API for the updated API/extension. After the updated API/extension 140/141 is generated, the updated API/extension 140/141 is stored in the database 112.

Turning back to the process 400, in a case the Legacy API Analyzer 128 determines at S412 the legacy API is a custom legacy API, the process 400 proceeds to S424, and the user is prompted to input data for creation of a custom business object. Then in S426, the generator element 120 generates an updated API using the custom business object via the simulator 134 and generator 136, as described above.

Figure 9:
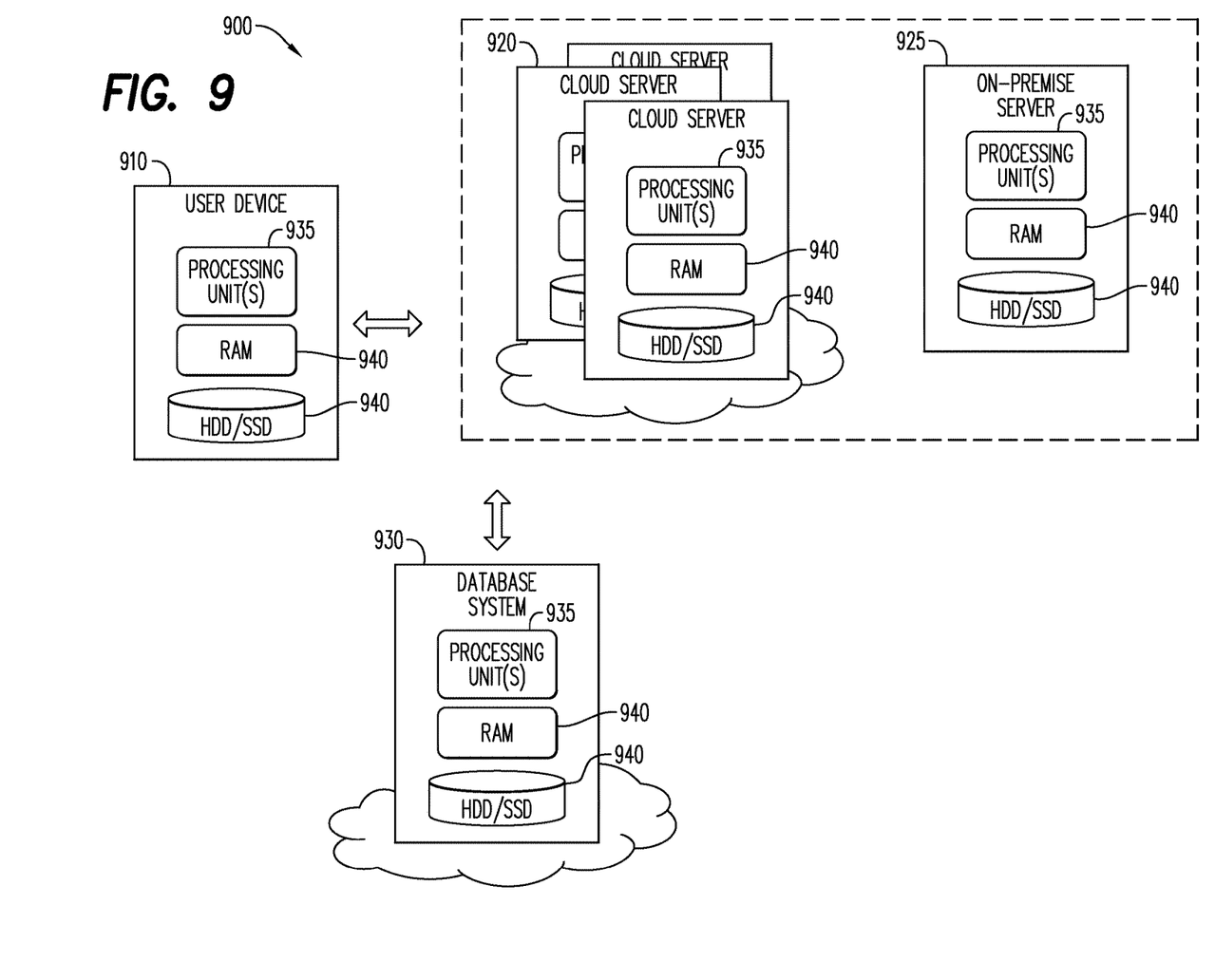
FIG. 9 is a block diagram of a cloud-based database deployment architecture according to some embodiments.

FIG. 9 illustrates a cloud-based database deployment 900 according to some embodiments. The illustrated components may reside in one or more public clouds providing self-service and immediate provisioning, autoscaling, security, compliance and identity management features.

User device 910 may interact with applications executing on one of the cloud application server 920 or the on-premise application server 925, for example via a Web Browser executing on user device 910, in order to create, read, update and delete data managed by database system 930. Database system 930 may store data as described herein and may execute processes as described herein to cause the provision of updated APIs/extensions for use with the user device 910. Cloud application server 920 and database system 930 may comprise cloud-based compute resources, such as virtual machines, allocated by a public cloud provider. As such, cloud application server 920 and database system 930 may be subjected to demand-based resource elasticity. Each of the user device 910, cloud server 920, on-premise application server 925, and database system 930 may include a processing unit 935 that may include one or more processing devices each including one or more processing cores. In some examples, the processing unit 935 is a multicore processor or a plurality of multicore processors. Also, the processing unit 935 may be fixed or it may be reconfigurable. The processing unit 935 may control the components of any of the user device 910, cloud server 920, on-premise application server 925, and database system 930. The storage devices 940 may not be limited to a particular storage device and may include any known memory device such as RAM, ROM, hard disk, and the like, and may or may not be included within a database system, a cloud environment, a web server or the like. The storage 940 may store software modules or other instructions/executable code which can be executed by the processing unit 935 to perform the method shown in FIGS. 2 and 4. According to various embodiments, the storage device 940 may include a data store having a plurality of tables, records, partitions and sub-partitions. The storage device 940 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system comprising:
a memory storing processor-executable program code; and
a processing unit to execute the processor-executable program code to:
receive an input of one or more legacy Application Programming Interface (API) identification elements for a legacy API, wherein the legacy API identification elements include at least a name of the legacy API and a legacy API type;
determine whether the received name of the legacy API and the legacy API type correspond to a standard legacy API or a custom legacy API, wherein the legacy API type of Intermediate Document (IDOC), Business API (BAPI) or Remote Function Call (RFC) corresponds to the standard legacy API;
in a case the received one or more legacy API identification elements correspond to the custom legacy API, generate a corresponding updated API using a custom business object, the generating including: identifying one or more tables involved with the custom business object, generating a service definition and providing a binding;

in a case the received one or more legacy API identification elements do correspond to the standard legacy API, determine whether the corresponding updated API is available;

in a case the corresponding updated API is not available, transmit a request to generate the corresponding updated API;

in a case the corresponding updated API is available, determine whether the legacy API includes at least one extension;

in a case the at least one extension is absent from the legacy API, transmit the corresponding updated API to a user; and in a case the legacy API does include the at least one extension, generate an updated corresponding API extension, and transmit the corresponding updated API and the updated corresponding API extension to the user, wherein generation of the updated corresponding API extension includes:
  simulation of the corresponding updated API including the updated corresponding API extension, and
  binding of the simulated corresponding updated API including the corresponding updated API extension to a client-server communication protocol, the binding adapted to integrate one or more service protocols.

2. The system of claim 1, wherein the standard legacy API is an API that was originally released prior to a request for the corresponding updated API.

3. The system of claim 1 wherein the legacy API is one of a Remote Function Call (RFC), a Business API (BAPI) and an Intermediate Document (IDOC).

4. The system of claim 1, wherein the at least one extension is one or more elements that modify a response of the standard legacy API.

5. The system of claim 1, wherein the corresponding updated API is an Advanced Business Application Programming (ABAP) Restful Application Programming Model (RAP) API.

6. The system of claim 1, wherein the received one or more legacy API identification elements is determined to correspond to the standard legacy API by identifying a presence or an absence of an identifier included in a name of the legacy API.

7. The system of claim 6, wherein the absence of the identifier indicates the legacy API corresponds to the standard legacy API and the presence of the identifier indicates the legacy API corresponds to the custom legacy API.

8. The system of claim 1, wherein an updated API mapper determines the corresponding updated API is available by identifying at least one of a common business object and a legacy API name.

9. The system of claim 1, wherein a legacy API analyzer determines the legacy API includes the at least one extension by identifying at least one extension field that is present in the legacy API and absent from the corresponding updated API.

10. The system of claim 9, wherein generation of the updated corresponding API extension further comprises execution of the processor-executable program code to:
  identify a legacy API structure;
  define one or more definitions for the updated corresponding API extension;
  display the simulated corresponding updated API including the updated API extension;
  and
  output the updated corresponding API including the generated updated corresponding API extension.

11. A method comprising:
receiving an input of one or more legacy Application Programming Interface (API) identification elements for a legacy API, wherein the legacy API identification elements include at least a name of the legacy API and a legacy API type;

determining whether the received name of the legacy API and the legacy API type correspond to a standard legacy API or a custom legacy API, wherein the legacy API type of Intermediate Document (IDOC), Business API (BAPI), or Remote Function Call (RFC) corresponds to the standard legacy API;

in a case the received one or more legacy API identification elements correspond to the custom legacy API, generating a corresponding updated API using a custom business object, the generating including:
  identifying one or more tables involved with the custom business object,
  generating a service definition, and
  providing a binding;

in a case the received one or more legacy API identification elements does correspond to the standard legacy API, determining whether the corresponding updated API is available;

in a case the corresponding updated API is available, determining whether the legacy API includes at least one extension; and in a case the legacy API does include the at least one extension, generating an updated corresponding API extension, and transmitting the corresponding updated API and the updated corresponding API extension to a user, wherein generation of the updated corresponding API extension includes:
  simulation of the corresponding updated API including the updated corresponding API extension, and
  binding of the simulated corresponding updated API including the corresponding updated API extension to a client-server communication protocol, the binding adapted to integrate one or more service protocols.

12. The method of claim 11, further comprising:
in a case the corresponding updated API is not available, transmitting a request to generate the corresponding updated API; and in a case the at least one extension is absent from the legacy API, transmitting the corresponding updated API to a user.

13. The method of claim 11, wherein the standard legacy API is an API that was originally released prior to a request for the corresponding updated API.

14. The method of claim 11, wherein the legacy API is one of a Remote Function Call (RFC), a Business API (BAPI) and an Intermediate Document (IDOC).

15. The method of claim 11, wherein the at least one extension is one or more elements that modify a response of the standard legacy API.

16. The method of claim 11, wherein the corresponding updated API is an Advanced Business Application Programming (ABAP) Restful Application Programming Model (RAP) API.

17. The method of claim 11, wherein the received one or more legacy API identification elements is determined to correspond to the standard legacy API by identifying an absence of an identifier included in a name of the legacy API, and the received one or more legacy API identification elements is determined to correspond to a custom legacy API by identifying a presence of the identifier included in the name of the legacy API.

18. The method of claim 11, wherein an updated API mapper determines the corresponding updated API is available by identifying at least one of a common business object and a legacy API name.

19. A non-transitory computer readable medium having executable instructions stored therein to perform a method, the method comprising:
   receiving an input of one or more legacy Application Programming Interface (API) identification elements for a legacy API, wherein the legacy API identification elements include at least a name of the legacy API and a legacy API type;
   determining whether the received name of the legacy API and the legacy API type correspond to a standard legacy API or a custom legacy API, wherein the legacy API type of Intermediate Document (IDOC), Business API (BAPI) or Remote Function Call (RFC) corresponds to the standard legacy API;
   in a case the received one or more legacy API identification elements correspond to the custom legacy API, generating a corresponding updated API using a custom business object, the generation including:
      identifying one or more tables involved with the custom business object,
      generating a service definition, and
      providing a binding;
   in a case the received one or more legacy API identification elements does correspond to the standard legacy API, determining whether the corresponding updated API is available;
   in a case the corresponding updated API is available, determining whether the legacy API includes at least one extension; and
   in a case the legacy API does include the at least one extension, generating an updated corresponding API extension, and transmitting the corresponding updated API and the updated corresponding API extension to a user, wherein generation of the updated corresponding API extension includes:
      simulation of the corresponding updated API including the updated corresponding API extension, and
      binding of the simulated corresponding updated API including the corresponding updated API extension to a client-server communication protocol, the binding adapted to integrate one or more service protocols.

20. The medium of claim 19, wherein an updated API mapper determines the corresponding updated API is available by identifying at least one of a common business object and a legacy API name.

\* \* \* \* \*